A. PERRETT.
TOOL OPERATING MACHINE.
APPLICATION FILED SEPT. 26, 1910.

986,856.

Patented Mar. 14, 1911.

3 SHEETS—SHEET 1.

WITNESSES:

INVENTOR

A. PERRETT.
TOOL OPERATING MACHINE.
APPLICATION FILED SEPT. 26, 1910.

986,856.

Patented Mar. 14, 1911.

3 SHEETS—SHEET 2.

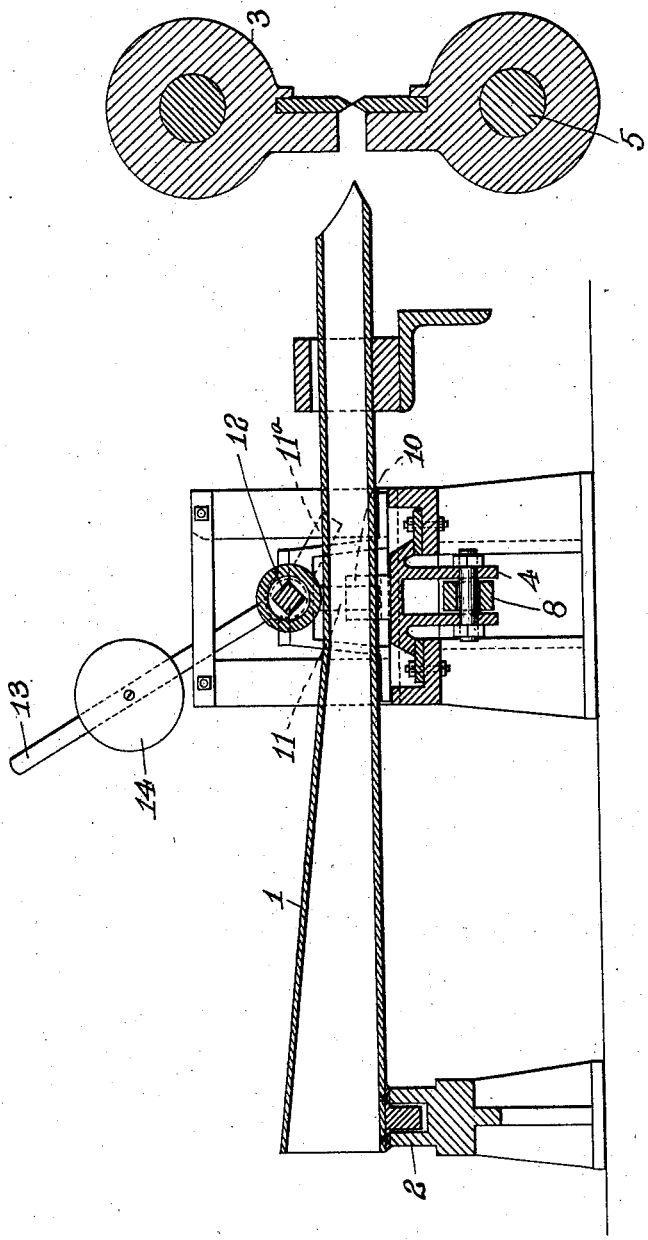

UNITED STATES PATENT OFFICE.

ALBERT PERRETT, OF PITTSBURG, PENNSYLVANIA.

TOOL-OPERATING MACHINE.

986,856.  Specification of Letters Patent.  Patented Mar. 14, 1911.

Application filed September 26, 1910. Serial No. 583,786.

*To all whom it may concern:*

Be it known that I, ALBERT PERRETT, residing at Pittsburg, in the county of Allegheny and State of Pennsylvania, a citizen of the United States, have invented or discovered certain new and useful Improvements in Tool-Operating Machines, of which improvements the following is a specification.
My invention relates to chutes or conveyers when used in connection with a tool operating machine.

More particularly my invention has to do with chutes and conveyers used in rolling mills to deliver rolled material to a tool operating machine, such as a pair of flying shears, when it is necessary to occasionally direct the path of the rolled material into a tool, and its object is a correlation in movement of such a conveyer and machine.

My invention is illustrated in the accompanying drawings in which—

Figure 1:
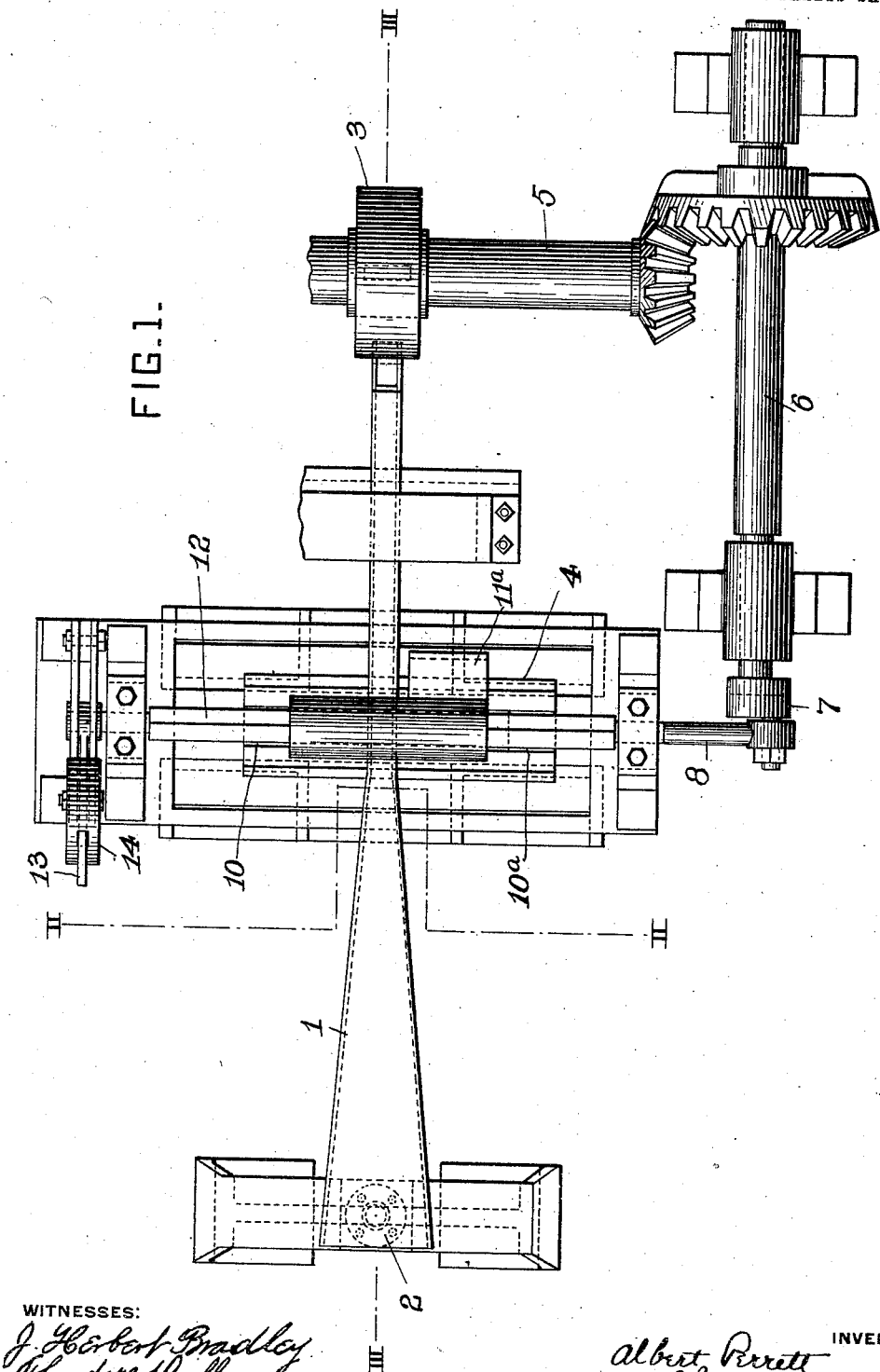
Figure 2:
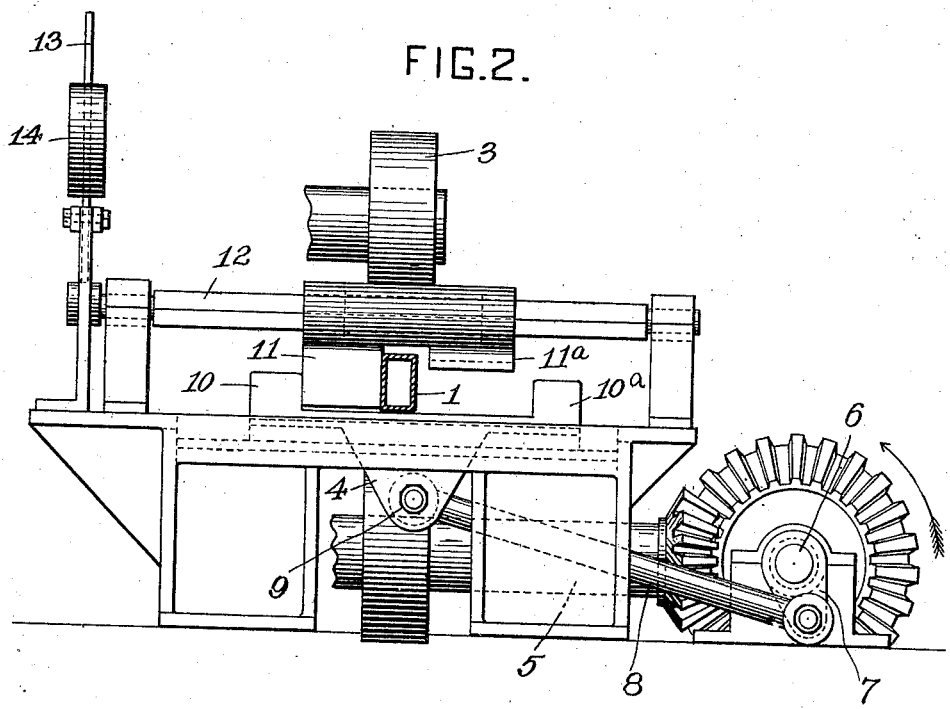

Figure 1 is a plan view of a machine embodying my invention; Fig. 2 is a transverse section on a line II—II of Fig. 1; and Fig. 3 is a longitudinal section on the line III—III Fig. 1.

Parts which are repeated in the several figures bear the same reference numerals in each case.

Referring to the drawings, the chute itself is shown at 1. It will be understood that this chute is so arranged that it will receive the rolled article, such as a bar of rolled steel, from the final pair of rolls of a rolling mill. The chute 1 is pivoted, as at 2, to the end that the delivery end of the chute may swing to alternate positions from which the finished article may be delivered in one or another desired path of movement. For example, one path of movement may be to the side of the tool operating machine and the other into said machine; or the paths may be one at each side of the machine and the mechanism be so arranged that the tool operating machine will perform its function while the trough is being shifted from one path to the other. It is in connection with this latter arrangement that I choose to describe my invention and the particular tool operating machine I employ in this description is a pair of flying or rotary shears.

The means which I preferably employ for effecting a shifting of the chute in accord with the turning of the shears are these:—I provide a slide 4, movable transversely of the chute, and which, through instrumentalities presently to be described, by its movement in suitable bearings, effects the shifting of the chute to and from its alternate positions. I correlate the shifting movement of this slide 4 to the rotation of the flying shears 3. The particular instrumentality is not essential to my invention, but as shown it consists of a prolongation of a shaft 5 of one of the shear members, a counter shaft 6 bevel geared to shaft 5, crank-arm 7 on the shaft 6, and connecting-rod 8, pivoted as at 9 to the slide 4. It will be observed that, so long as the rotary shears turn, this slide 4 will reciprocate in its bearing.

The slide 4 is provided with oppositely-placed shoulders 10 and 10$^a$ between which the chute 1 extends. The distance between these oppositely-placed shoulders 10 and 10$^a$ exceeds the width of the chute, and the range of reciprocation is such that the shoulders exert a thrust to swing the chute 1 only through an interposed block. This interposed block is a two-part block, and conveniently consists of a pair of fingers 11 and 11$^a$ rotatable upon a shaft 12. The arrangement is such that either one or the other of the fingers may be shifted to position between the chute 1 and one or the other of the shoulders on the slide 4; but that when one finger is in position the other one is moved from operative position. In other words, when it is desired to move the chute from left to right (as shown in Fig. 2), the finger 11 is thrown into the path of the moving shoulder 10 (in a manner hereinafter to be described) and, by the motion of the shoulder, is shifted in the desired direction, engaging and moving at the same time the trough 1. In like manner the motion from right to left is accomplished by the shoulder 10$^a$ and finger 11$^a$. It will be understood that this block, consisting of the fingers 11 and 11$^a$, may move longitudinally on the shaft 12 as well as rotate with said shaft. With this arrangement, while the finger 11 is lying in the path of the shoulder 10, the finger 10$^a$ is clear of the path of the shoulder 11$^a$, thereby permitting the shoulder 10$^a$ to pass beneath the finger 11$^a$.

The fingers 11 and 11$^a$ may be interposed as described in any desirable way, but, as illustrated, they are preferably mounted radially upon a shaft 12 in a manner substantially as shown in Fig. 3. In this figure the finger 11ª is not visible since it lies back of the section line III—III. However, for illustrating the preferable relative positions of these fingers, the finger 11ª is shown dotted in this figure. In this construction it will be observed that the operative or inoperative position of a finger may be changed by rotating the shaft through a small arc. This rotation may be accomplished in any convenient manner, as, for example, by a steam or compressed air cylinder or by a manually operated lever. For illustration I show a manually operated lever 13 rigidly attached to the shaft 12, which lever when thrown to its alternate position will throw one finger clear of the slide's path and the other finger into its path.

In case a shoulder in its oscillating movement happens to be passing under a finger at the time it is desired to shift the chute, it will be impossible to move the lever through its entire arc of traverse. To bring the lever to its final position a gravity block 14 is attached thereto, which will be effective when the shoulder has passed beyond the finger, in swinging the lever through the remainder of its arc of traverse. The finger will thereby be brought into the path of the shoulder and will be engaged in the return stroke of said shoulder, causing, in the manner already described, the shifting of the chute. It will be observed too that after the trough has been shifted from one position or the other, the continued reciprocation of the slide 4 will not move it from that position so long as the position of the finger is not changed, and even when the finger is changed the shifting will be accomplished only at the proper time in the cycle of operation.

The operation of this machine in connection with the arrangement herein particularly described, namely, when the path of movement is first at one side of the tool operating machine and then on the other, is as follows:—The rod or bar travels in one of said paths until a cut therein becomes desirable, at which time the shaft 12 is turned by lever or otherwise. At the proper time in the cycle of the mechanism the trough is shifted, as described. When, in the shifting, the trough is immediately in front of the shears the material issuing from said troughs is cut thereby, and the portion of the material behind the cut now passes, on the other side of the shears, without further cutting. Furthermore the advantages of the machine will be apparent. Even supposing it to be in the power of a workman to throw the chute from side to side at the right instant by observing the movement of the shears and governing his movements accordingly, the greatest precision will be required for successfully accomplishing one cut and preventing more than one. By the proper correlation of the moving parts, it may readily be seen that the paths of movement of the material may be into and to one side of the shears. At the time the path of movement is into the shears, the material will be cut into predetermined lengths; but when the material is passing at one side no cuts will be made therein.

While I have described my invention in its relation to a pair of flying shears it will be understood that I do not limit myself in its application to this specific tool operating machine.

I claim herein as my invention:

1. In a tool-operating machine, the combination of an intermittently acting tool, a feed chute normally out of, but movable transversely through, position of delivery to said tool, means operative with predetermined relation to the action of the tool for moving said chute, and means operative at any time for bringing said chute-moving means to operative position, substantially as described.

2. In a tool-operating machine, the combination of an intermittently acting tool, a feed chute movable transversely to the position of delivery to said tool, means operative with predetermined relation to the action of the tool-operating machine for moving said chute, and means operative at any time for bringing said chute-moving means to operative position, substantially as described.

3. In a tool-operating machine, the combination of an intermittently acting tool, a feed chute movable transversely to the position of delivery to said tool and transversely to the line of movement of material through it, a slide mounted for reciprocation and provided with oppositely placed shoulders arranged on opposite sides of said chute and in reciprocation engaging said chute through interposed fingers and shifting said chute, means for reciprocating said slide, and means for shifting the said fingers in alternation to and from operative position, substantially as described.

4. In combination with a pair of rotary shears for a steel mill, a feed chute or conveyer pivoted to deliver steel from one side of said shears through their bite and to the other side thereof, a slide movable transversely of said chute and provided with a pair of shoulders extending on either side of said chute the distance between said shoulders being greater than the width of said chute, the reciprocation of said chute being coördinated with the movement of said shears, a rotary shaft, a pair of fingers carried by said shaft and arranged to be brought by rotation of said shaft in alternation to position between said chute and one of the shoulders of said slide, and means automatically operative at the proper instant in the reciprocation of the slide, and after an initial turning of said shaft, to effect a further turning of said shaft and a reversal of the positions of said blocks, substantially as described.

In testimony whereof, I have hereunto set my hand.

ALBERT PERRETT.

Witnesses:
PAUL N. CRITCHLOW,
ALICE A. TRILL.

Copies of this patent may be obtained for five cents each, by addressing the "Commissioner of Patents, Washington, D. C."